(12) United States Patent
Bowman et al.

(10) Patent No.: US 10,859,190 B2
(45) Date of Patent: Dec. 8, 2020

(54) SPRUNG COUPLING

(71) Applicant: Victaulic Company, Easton, PA (US)

(72) Inventors: Matthew A. Bowman, Palmer, PA (US); Philip Wayne Bancroft, Belvidere, NJ (US); Scott D. Madara, Nazareth, PA (US); Kathryn E. Yovanovich, Bethlehem, PA (US); Thomas C. Savage, Doylestown, PA (US)

(73) Assignee: Victaulic Company, Easton, PA (US)

( * ) Notice: Subject to any disclaimer, the term of this patent is extended or adjusted under 35 U.S.C. 154(b) by 267 days.

(21) Appl. No.: 15/593,662

(22) Filed: May 12, 2017

(65) Prior Publication Data

US 2017/0328500 A1 Nov. 16, 2017

Related U.S. Application Data

(60) Provisional application No. 62/336,885, filed on May 16, 2016, provisional application No. 62/336,879, filed on May 16, 2016.

(51) Int. Cl.
*F16L 17/04* (2006.01)
*F16L 21/08* (2006.01)
(Continued)

(52) U.S. Cl.
CPC .............. *F16L 17/04* (2013.01); *F16L 21/06* (2013.01); *F16L 21/08* (2013.01); *F16L 37/091* (2013.01); *F16L 2201/10* (2013.01)

(58) Field of Classification Search
CPC ......... F16L 17/04; F16L 17/06; F16L 23/036; F16L 23/18; F16L 23/22; F16L 21/06; F16L 21/08
(Continued)

(56) References Cited

U.S. PATENT DOCUMENTS 285,179 A 9/1883 Tibbals
1,074,395 A 9/1913 Welch
(Continued)

FOREIGN PATENT DOCUMENTS

DE 3111997 10/1982
DE 3443942 6/1985
(Continued)

OTHER PUBLICATIONS

Copenheaver, Blane R.; International Search Report from counterpart International Patent Application No. PCT/US2017/032601, Jul. 20, 2017, pp. 1-2, United States Patent and Trademark Office as Searching Authority, Alexandria, Virginia USA.
(Continued)

*Primary Examiner* — Aaron M Dunwoody

(74) *Attorney, Agent, or Firm* — Ballard Spahr LLP

(57) ABSTRACT

A coupling has first and second segments attached to one another end to end surrounding a central space for receiving pipe elements. A spring assembly attaches the segments at one end and an adjustable attachment assembly attaches the segments at the opposite end. The spring assembly biases the segments away from one another sufficient to permit insertion of the pipe elements into the central space while the segments are attached to one another. The coupling may include a split ring toothed retainer for coupling plain end pipe elements, or it may have arcuate keys which engage grooved or shouldered pipe elements.

23 Claims, 14 Drawing Sheets

(51) Int. Cl.
*F16L 37/091* (2006.01)
*F16L 21/06* (2006.01)

(58) Field of Classification Search
USPC .................. 285/112, 337, 367, 419, 420
See application file for complete search history.

(56) References Cited

U.S. PATENT DOCUMENTS

| | | | |
|---|---|---|---|
| 1,649,594 A | | 11/1927 | Johnson |
| 2,021,082 A | | 11/1935 | North |
| 2,459,251 A | * | 1/1949 | Stillwagon .............. F16L 17/04 |
| | | | 285/104 |
| 3,788,677 A | | 1/1974 | Stade et al. |
| 3,794,360 A | | 2/1974 | Bachle et al. |
| 4,273,367 A | | 6/1981 | Keeney et al. |
| 4,408,788 A | | 10/1983 | Beukema |
| 4,443,029 A | | 4/1984 | Laxo |
| 4,702,499 A | | 10/1987 | deRaymond et al. |
| 5,080,400 A | | 1/1992 | Adamek |
| 5,782,499 A | | 7/1998 | Gfrerer et al. |
| 5,813,437 A | | 9/1998 | Esser |
| 6,030,006 A | | 2/2000 | Lin |
| 6,056,332 A | * | 5/2000 | Foster .................... F16L 23/10 |
| | | | 24/285 |
| 6,276,729 B1 | * | 8/2001 | Sanwald ................ B01L 3/565 |
| | | | 285/368 |
| 6,367,849 B1 | | 4/2002 | Tatsuta et al. |
| 6,672,631 B1 | * | 1/2004 | Weinhold ............... F16L 23/06 |
| | | | 24/285 |
| 7,341,287 B2 | | 3/2008 | Gibb et al. |
| 7,490,866 B2 | | 2/2009 | Webb et al. |
| 7,996,981 B2 | | 8/2011 | Dole et al. |
| 8,777,277 B2 | | 7/2014 | Dole et al. |
| 8,827,214 B2 | * | 9/2014 | Ogawa .................. F16L 3/1041 |
| | | | 248/74.1 |
| 9,151,422 B2 | | 10/2015 | Kayacik et al. |
| 9,890,884 B1 | * | 2/2018 | Chiproot ............... F16L 21/005 |
| 9,976,677 B2 | | 5/2018 | Lurk |
| 2005/0067538 A1 | | 3/2005 | Stigler |
| 2009/0127846 A1 | | 5/2009 | Dole et al. |
| 2010/0197627 A1 | | 8/2010 | Baudoin et al. |
| 2010/0296925 A1 | | 11/2010 | Sakai |
| 2014/0327238 A1 | * | 11/2014 | Bowman ................ F16L 17/04 |
| | | | 285/112 |
| 2015/0021911 A1 | * | 1/2015 | Bowman ............... F16L 21/005 |
| | | | 285/340 |
| 2015/0176728 A1 | * | 6/2015 | Bowman ............... F16L 21/065 |
| | | | 285/309 |
| 2015/0204471 A1 | | 7/2015 | Sato |
| 2016/0084420 A1 | * | 3/2016 | Barrientos ............ F16L 33/035 |
| | | | 285/33 |
| 2018/0163905 A1 | | 6/2018 | Ohnemus et al. |
| 2018/0163906 A1 | | 6/2018 | Ohnemus et al. |
| 2019/0032824 A1 | | 1/2019 | McNamara et al. |
| 2019/0032825 A1 | | 1/2019 | McNamara et al. |

FOREIGN PATENT DOCUMENTS

| | | |
|---|---|---|
| DE | 3443943 | 6/1985 |
| DE | 10006029 | 8/2001 |
| EP | 1840439 B1 | 6/2010 |
| EP | 2487397 | 8/2012 |
| FR | 2683017 | 4/1993 |
| FR | 2921985 | 3/2013 |
| JP | S5615891 U | 2/1981 |
| JP | 6147362 | 5/1994 |
| JP | 2008202791 | 9/2008 |
| JP | 2009167971 | 7/2009 |
| JP | 2012026578 | 2/2012 |
| JP | 2013542382 | 11/2013 |
| JP | 2014001848 | 1/2014 |

OTHER PUBLICATIONS

Copenheaver, Blane R.; Written Opinion from counterpart International Patent Application No. PCT/US2017/032601, Jul. 20, 2017, pp. 1-6, United States Patent and Trademark Office as Searching Authority, Alexandria, Virginia USA.

* cited by examiner

SPRUNG COUPLING

CROSS REFERENCE TO RELATED APPLICATIONS

This application is based upon and claims the benefit of priority to U.S. Provisional Application No. 62/336,879, filed May 16, 2016, and U.S. Provisional Application No. 62/336,885, filed May 16, 2016, both provisional applications being hereby incorporated by reference.

FIELD OF THE INVENTION

This invention relates to mechanical pipe couplings for joining pipe elements.

BACKGROUND

Mechanical couplings for joining pipe elements together end-to-end comprise interconnectable segments that are positionable circumferentially surrounding the end portions of co-axially aligned pipe elements. The term "pipe element" is used herein to describe any pipe-like item or component having a pipe-like form. Pipe elements include pipe stock, pipe fittings such as elbows, caps and tees as well as fluid control components such as valves, reducers, strainers, restrictors, pressure regulators and the like.

Each mechanical coupling segment comprises a housing having projections which extend inwardly from the housing and engage, for example, the outer surfaces of pipe elements of various configurations including, for example, pipe elements having circumferential grooves. Engagement between the projections and the pipe elements provides mechanical restraint to the joint and ensures that the pipe elements remain coupled even under high internal pressure and external forces. The housings define an annular channel that receives a ring gasket or seal, typically an elastomeric ring which engages the ends of each pipe element and cooperates with the segments and the pipe elements to provide a fluid tight seal. The segments have connection members, typically in the form of lugs which project outwardly from the housings. The lugs are adapted to receive fasteners, such as nuts and bolts, which are adjustably tightenable to draw the segments toward one another.

Mechanical couplings for grooved pipe elements according to the prior art have continuous arcuate projections on the segments that engage the outer surfaces of the pipe elements which they are joining end to end. These arcuate projections are part of the segment structure commonly referred to as the "keys" of the coupling. The keys may engage the outer surface of pipe element in various configurations including, for example, pipe element having circumferential grooves.

The arcuate projections on prior art couplings for grooved pipe elements typically have arcuate surfaces with a radius of curvature that is marginally larger than the radius of curvature of the outer surface of the pipe element within the groove that it is intended to engage. For couplings used with grooved pipe elements, the radii of curvature of the arcuate surfaces are smaller than the radii of curvature of the outer surfaces of the pipe elements outside of the grooves so that the projections fit within and engage the grooves.

Methods of securing pipe elements in end to end relation comprise a sequential installation process when mechanical couplings according to the prior art are used. Typically, the coupling is received by the technician with the segments bolted together and the ring gasket captured within the segments' channels. The technician first disassembles the coupling by unbolting it, removes the ring gasket, lubricates it (if not pre-lubricated) and places it around the ends of the pipe elements to be joined. Installation of the ring gasket often requires that it be lubricated and stretched to accommodate the pipe elements. With the ring gasket in place on both pipe elements, the segments are then placed one at a time straddling the ends of the pipe elements and capturing the ring gasket against them. During placement, the segments engage the gasket, the projections are aligned with the grooves, the bolts are inserted through the lugs, the nuts are threaded onto the bolts and tightened, drawing the coupling segments toward one another, compressing the gasket and engaging the projections within the grooves.

As evident from the previous description, installation of mechanical pipe couplings according to the prior art requires that the technician typically handle at least seven individual piece parts (and more when the coupling has more than two segments), and must totally disassemble and reassemble the coupling. Significant time, effort and expense would be saved if the technician could install a mechanical pipe coupling without first totally disassembling it and then reassembling it, piece by piece.

SUMMARY

The invention concerns a coupling for joining pipe elements. In one example embodiment the coupling comprises first and second segments positioned end to end surrounding a central space for receiving the pipe elements. A spring assembly joins a first end of the first segment to a first end of the second segment. The spring assembly biases the segments away from one another. An adjustable attachment assembly joins a second end of the first segment to a second end of the second segment. The adjustable attachment assembly is adapted to draw the first and second segments toward one another and into engagement with the pipe elements.

In one example embodiment, the spring assembly comprises a first boss projecting from the first end of the first segment and a second boss projecting from the first end of the second segment. The second boss is positioned adjacent to the first boss. A first fulcrum is positioned on the first boss and contacts the second boss. The segments pivot about the first fulcrum. A link extends between and capturing the first and second bosses.

An example embodiment may further comprise a second fulcrum positioned on the second boss. The second fulcrum contacts the first fulcrum.

Another example embodiment comprises a first land positioned contiguous with the first fulcrum on the first boss and a second land positioned contiguous with the second fulcrum on the second boss. The first and second lands are oriented angularly with respect to a plane defining an interface between the first and second segments.

Further by way of example, the coupling may comprise a first head projecting from the first boss and a second head projecting from the second boss. The link engages the first and second heads for retaining the link to the bosses. In an example embodiment the link comprises a ring encircling the first and second bosses.

By way of example the adjustable attachment assembly may comprises a first lug attached to the second end of the first segment. A second lug is attached to the second end of the second segment and is positioned in facing relation with the first lug. Each lug defines a respective hole. A fastener extends between the first and second lugs. The fastener is received within the respective holes. The fastener is adjustable for drawing the segments toward one another against the biasing of the spring assembly.

In an example embodiment each of the first and second segments may comprises first and second channels positioned on opposite sides of the segments. Each of the channels extends between the ends of the segments and has a first floor and a second floor facing the central space. The first floor has a greater radius of curvature than the second floor. First and second retainers are positioned respectively in the first and second channels. Each of the retainers comprises a band having oppositely disposed ends. A plurality of teeth are positioned along one edge of the band. The teeth project toward the central space. At least one tab is positioned along an opposite edge of the band. The band overlies the first floor. The at least one tab overlies the second floor when the retainers are positioned within the channels. An example according to the invention may comprise a plurality of tabs.

By way of example, a third channel is positioned between the first and second channels in each of the segments. The third channels extend between the ends of the segments and facing the central space.

In an example embodiment, the teeth are oriented angularly with respect to a line extending radially from an axis arranged coaxially with the central space. In a further example, the at least one tab is oriented perpendicularly to a line extending radially from an axis arranged coaxially with the central space. Further by way of example, the at least one tab is offset from the band toward an axis arranged coaxially with the central space. In a specific example embodiment, the at least one tab projects toward the third channel.

In an example embodiment, a first aperture is positioned in at least one of the segments. The first aperture may be aligned with the first channel and provide a line of sight toward the central space. In an example embodiment the first aperture is positioned between the first and second segments. The first aperture may comprise a trough positioned at an interface between the first and second segments by way of example. A further example comprises a second aperture in at least one of the segments. The second aperture may be aligned with the second channel and provide a line of sight toward the central space. The second aperture may be positioned between the first and second segments and may comprise a trough positioned at an interface between the two segments for example.

In an example embodiment a ring seal is positioned within the third channels. The ring seal has an inner surface sized to receive the pipe elements and an outer surface sized to support the segments in spaced apart relation sufficient to permit insertion of the pipe elements into the central space while the segments are attached to one another. Further by way of example, the retainer bands may be sized to cooperate with the ring seals to support the housing portions in the spaced apart relation.

In another example embodiment, each of the first and second segments comprises first and second shoulders positioned on opposite sides of each of the segments. The shoulders extend lengthwise along the segments and project toward the central space. The shoulders define a channel therebetween. A first arcuate surface is positioned on the first shoulder, and a second arcuate surface is positioned on the second shoulder. The arcuate surfaces face the central space in this example. A plurality of projections may be positioned on each of the first and second arcuate surfaces. The projections project toward the central space. In an example embodiment, the first arcuate surface may have a first radius of curvature and the second arcuate surface may have a second radius of curvature wherein the second radius of curvature is less than the first radius of curvature.

In an example embodiment a ring seal is positioned within the channel. The ring seal has an inner surface sized to receive the pipe elements and an outer surface sized to support the segments in spaced apart relation sufficient to permit insertion of the pipe elements into the central space while the segments are attached to one another.

The invention further encompasses, in combination, a coupling and a first pipe element. The coupling is for joining a second pipe element to the first pipe element. In an example embodiment, the coupling comprises first and second segments positioned end to end surrounding a central space for receiving the pipe elements. First and second shoulders are positioned on opposite sides of each of the segments. The shoulders extend lengthwise along the segments and project toward the central space. A first arcuate surface is positioned on the first shoulder. A second arcuate surface is positioned on the second shoulder. The arcuate surfaces face the central space. A spring assembly joins a first end of the first segment to a first end of the second segment. The spring assembly biases the segments away from one another. An adjustable attachment assembly joins a second end of the first segment to a second end of the second segment. The adjustable attachment assembly is adapted to draw the first and second segments toward one another and into engagement with the pipe elements. The first pipe element comprises a rim projecting outwardly from the first pipe element and extending circumferentially. The rim is positioned in spaced relation to an end of the first pipe element. The rim engages the first shoulder and is captured within the central space.

In an example embodiment the rim is defined by a circumferential groove in the first pipe element. In another example embodiment the rim is defined by a circumferential bead which projects radially outwardly from the first pipe element.

In an example embodiment the spring assembly comprises a first boss projecting from the first end of the first segment. A second boss projects from the first end of the second segment and is positioned adjacent to the first boss. A first fulcrum is positioned on the first boss and contacts the second boss. The segments pivot about the first fulcrum. A link extends between and capturing the first and second bosses.

An example embodiment may further comprise a second fulcrum positioned on the second boss. The second fulcrum contacts the first fulcrum. A first land may be positioned contiguous with the first fulcrum on the first boss, and a second land may be positioned contiguous with the second fulcrum on the second boss. The first and second lands are oriented angularly with respect to a plane defining an interface between the first and second segments. In another example embodiment of a combination according to the invention, a first head projects from the first boss, and a second head projects from the second boss. The link engages the first and second heads for retaining the link to the bosses. In an example embodiment the link comprises a ring encircling the first and second bosses.

In an example embodiment of the combination, the adjustable attachment assembly comprises a first lug attached to the second end of the first segment. A second lug is attached to the second end of the second segment and is positioned in facing relation with the first lug. Each lug defines a respective hole. A fastener extends between the first and second lugs. The fastener is received within the respective holes. The fastener is adjustable for drawing the segments toward one another against the biasing of the spring assembly.

In a further example embodiment the combination comprises a channel positioned between the first and second shoulders in each of the segments. The channels extend between the ends of the segments and face the central space. Further by way of example, a ring seal is positioned within the channels. The ring seal has an inner surface sized to receive the pipe elements and an outer surface sized to support the segments in spaced apart relation sufficient to permit insertion of the second pipe element into the central space while the segments are attached to one another and the first pipe element is captured within the central space.

A plurality of projections may be positioned on each of the first and second arcuate surfaces in an example embodiment of the combination. The projections project toward the central space. An example embodiment may further comprise at least one aperture in at least one of the segments. The at least one aperture may be positioned between the first and second segments. In an example embodiment, the at least one aperture comprises a trough positioned at an interface between the first and second segments.

The invention also encompasses a method of assembling the combination coupling and pipe element. In one example embodiment the method comprises:
  positioning the first pipe element with the rim engaged with the first shoulder of the first segment;
  engaging the first end of the first segment with the first end of the second segment to form the spring assembly;
  supporting the first and second segments in spaced apart relation sufficient to permit insertion of the second pipe element into the central space while capturing the first pipe element within the central space;
  attaching the second end of the first segment to the second end of the second segment using the adjustable attachment assembly.

Further by way of example, the method may comprise:
  engaging the first pipe element with a ring seal;
  positioning the ring seal within a channel defined by the first and second shoulders of the first segment.

By way of example, the method may further include supporting the first and second segments in spaced apart relation sufficient to permit insertion of the second pipe element into the central space while capturing the first pipe element within the central space comprises support the segments on a ring seal positioned within a channel positioned between the first and second shoulders in each of the segments.

In an example embodiment, engaging the first end of the first segment with the first end of the second segment to form the spring assembly may comprise:
  joining a first boss projecting from the first end of the first segment with a second boss projecting from a first end of the second segment using a link, and
  contacting the second boss with a fulcrum positioned on the first boss.

Further by way of example, joining the first boss projecting from the first end of the first segment with a second boss projecting from the first end of the second segment using the link may comprise inserting the projections within a ring such that the ring surrounds the bosses.

In another example, attaching the second end of the first segment to the second end of the second segment using the adjustable attachment assembly may comprise attaching a first lug mounted on the second end of the first segment to a second lug mounted on the second end of the second segment using a fastener extending between the first and second lugs.

In an example embodiment for joining the second pipe element to the first pipe element, the example method comprises:
  with the segments attached to one another in spaced apart relation and with the rim of the first pipe element captured within the central space, inserting the second pipe element into the central space;
  engaging the second pipe element with the ring seal;
  drawing the segments toward one another using the adjustable attachment assembly.

An example method may further comprise engaging the first and second arcuate surfaces with the first and second pipe elements respectively upon drawing the segments toward one another. An example method may further comprise engaging projections on the first and second arcuate surfaces with the first and second pipe elements respectively upon drawing the segments toward one another.

In an example embodiment, the drawing the segments toward one another using the adjustable attachment assembly may comprise:
  tightening a fastener extending between first and second lugs, the first lug being attached to the second end of the first segment, the second lug being attached to the second end of the second segment and positioned in facing relation with the first lug, the fastener being adjustable for drawing the segments toward one another against the biasing of the spring assembly.

By way of example, a method further comprises:
  observing, through an aperture in at least one of the segments, whether or not the second pipe element is present within the central space;
  adjusting a positions of the second pipe element within the central space if the second pipe element is not present within the central space; and
  drawing the segments toward one another once the second pipe element is observed to be present within the central space.

DETAILED DESCRIPTION

Figure 1:
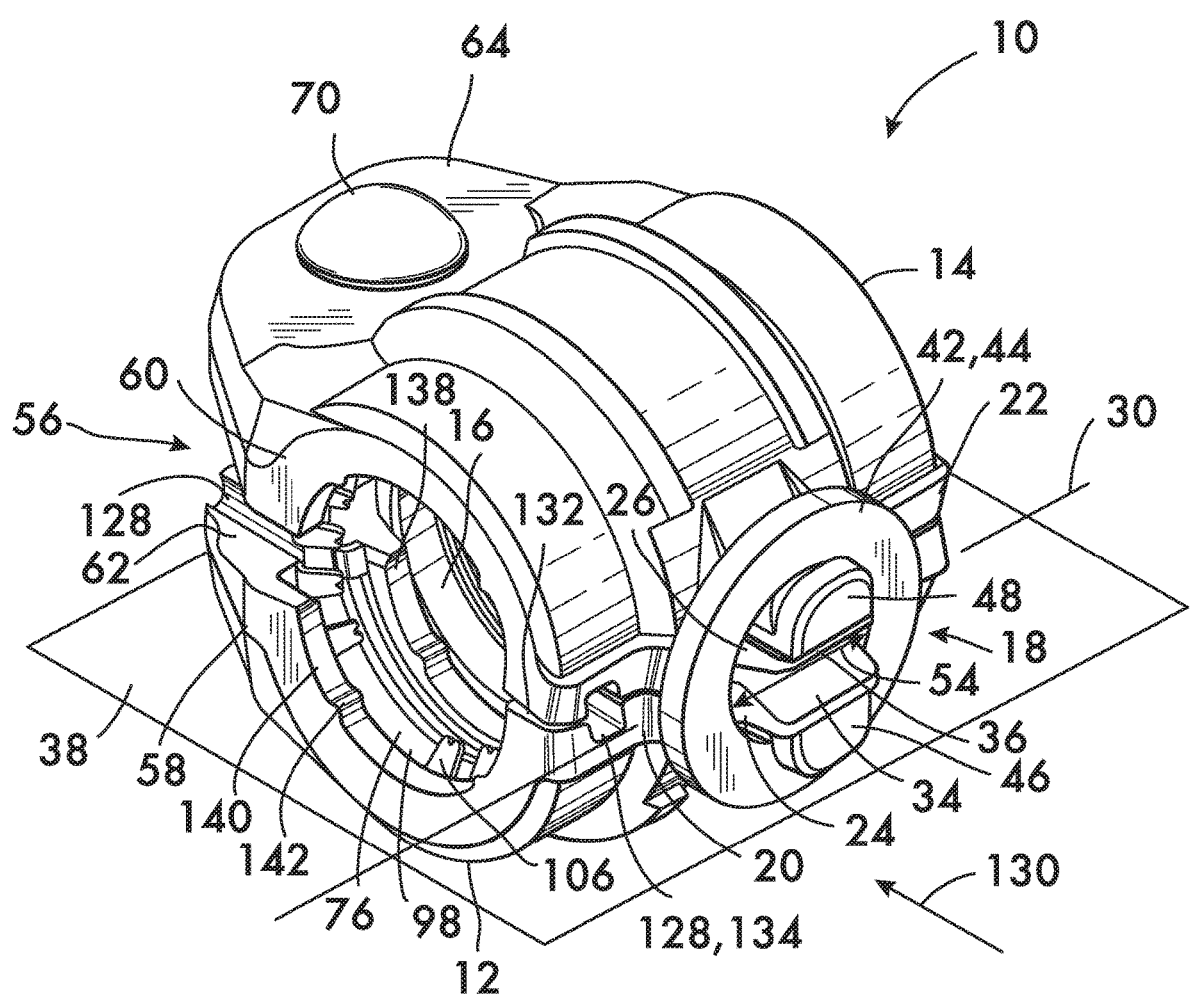
FIG. 1 is an isometric view of an example embodiment of a pipe coupling according to the invention.
Figure 1A:
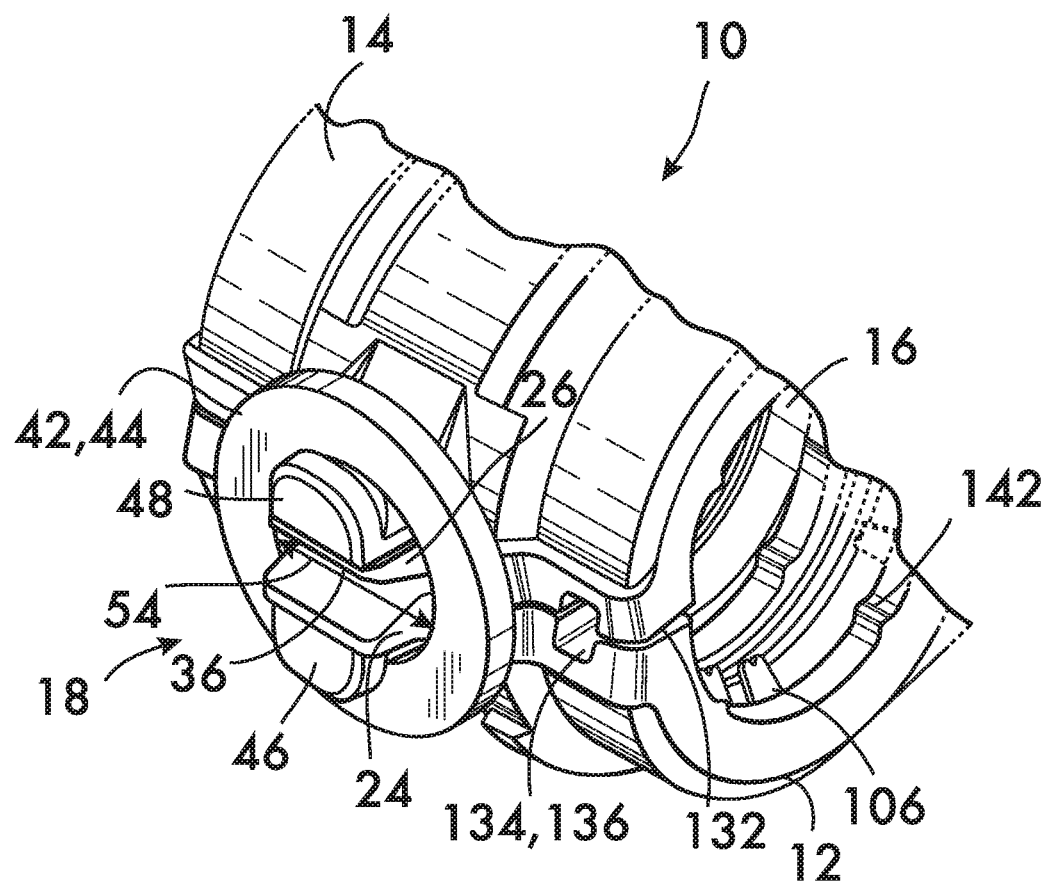
FIG. 1A is an isometric view of a portion of the example pipe coupling shown in FIG. 1.

An example embodiment of a coupling 10 according to the invention is shown in FIGS. 1 and 1A. Coupling 10 is for joining pipe elements and comprises first and second segments 12 and 14 positioned end to end surrounding a central space 16 for receiving the pipe elements. A spring assembly 18 joins a first end 20 of first segment 12 to a first end 22 of the second segment 14. The spring assembly 18 biases the segments 12 and 14 away from one another toward or into an open, pre-assembled state shown. When in this open or pre-assembled state, pipe elements can be inserted into the central space 16 without disassembling the coupling 10 as described below.

Figure 2:
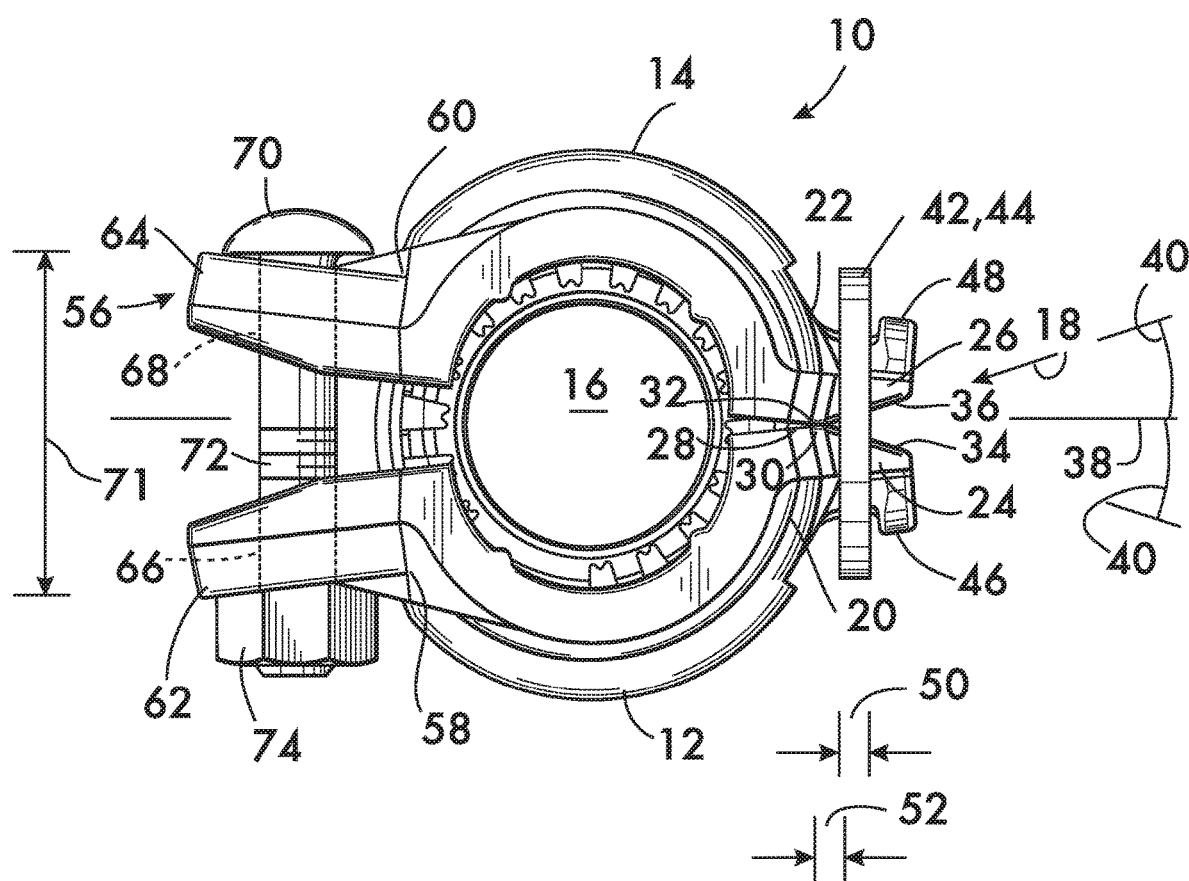
FIG. 2 is an axial view of the example pipe coupling shown in FIG. 1.

The example spring assembly 18 shown in FIGS. 1 and 2 comprises a first boss 24 projecting from the first end 20 of the first segment 12, and a second boss 26 projecting from the second end 22 of the second segment 14. The second boss 26 is positioned adjacent to the first boss 24. Bosses 24 and 26 are cantilevers and thus are substantially responsible for the biasing force of the spring assembly 18 as described below. A first fulcrum 28 is positioned on the first boss 24, the first fulcrum 28 contacting the second boss 26 and providing an axis 30 about which the segments 12 and 14 may pivot. In this example embodiment a second fulcrum 32 is positioned on the second boss 26. The second fulcrum 32 contacts the first fulcrum 28 to further define the pivot axis 30 about which the segments 12 and 14 pivot. First and second fulcrums 28 and 32 are defined in this example embodiment by first and second lands 34 and 36. The first and second lands 34 and 36 are respectively positioned on the first and second bosses 24 and 26, the first land 34 being contiguous with the first fulcrum 28, and the second land 36 being contiguous with the second fulcrum 32 (when present). At least the first land 34 is oriented angularly with respect to a plane 38 comprising the interface between the first and second segments 12 and 14. In this example embodiment both the first and second lands 34 and 36 are angularly oriented with respective orientation angles 40.

A link 42 extends between the first and second bosses 24 and 26. Link 42 captures the bosses, while permitting pivoting motion of the segments 12 and 14. In this example the link 42 comprises a ring 44 which encircles the first and second bosses 24 and 26. Ring 44 is retained on the bosses 24 and 26 by engagement with first and second heads 46 and 48 respectively projecting from the first and second bosses 24 and 26. Ring 44 and the bosses 24 and 26 cooperate to provide the spring biasing action of the spring assembly 18. The thickness 50 of the ring 44, the distance 52 between the fulcrums 28 and 32 and the point where the bosses 24 and 26 engage the ring 44, along with the area moment of inertia of the bosses, are parameters which will establish the spring constant of the spring assembly 18 and thus determine the amount of force necessary to close the coupling 10 and effect a joint. The angular orientation 40 of the lands 34 and 36 and the distance the fastener 70 has been tightened each act to set the maximum limit of separation between the segments 12 and 14, and the inner diameter 54 of the ring 44 determines the minimum separation of the segments when supported by an undeformed spring assembly 18 as shown in FIGS. 1 and 2. In one embodiment, the angular orientation 40 is such that, if the fastener 70 is not present (such as during the assembly of the coupling by the manufacturer) bosses 24, 26 may be brought near enough together that the inner diameter 54 of ring 44 will clear heads 46, 48, allowing ring 44 to be easily assembled over bosses 24, 26. Subsequent assembly and tightening of fastener 70 to a pre-determined distance 71 (see FIG. 2) acts to separate heads 46, 48 sufficient to retain ring 44 behind heads 46 and 58 as described above. The ring inner diameter 54 may be sized to hold the segments 12 and 14 in the open or pre-assembled state sufficient to permit insertion of pipe elements into the central space 16, or the diameter 54 may be larger, and permit the segments 12 and 14 to be supported in the open or pre-assembled state by other elements of the coupling as described below. In this situation the segments 12 and 14 will have some angular free play as the segments are drawn toward one another to close the coupling, the spring assembly 18 not immediately coming into effect upon pivoting of the segments.

Segments 12 and 14 are drawn toward one another by an adjustable attachment assembly 56. Attachment assembly 56 joins the second end 58 of the first segment 12 to the second end 60 of the second segment 14. Attachment assembly 56 is adapted to draw the segments 12 and 14 toward one another and into engagement with the pipe elements as described below. In this example the adjustable attachment assembly 56 comprises a first lug 62 attached to the second end 58 of the first segment 12, and a second lug 64 attached to the second end 60 of the second segment 14. Each lug 62, 64 defines a respective hole 66, 68 which receive a fastener 70 that extends between the lugs. In this example fastener 70 comprises a bolt 72 and a nut 74, which, when tightened, draw the segments 12 and 14 toward one another against the biasing force of the spring assembly 18.

Figure 3:
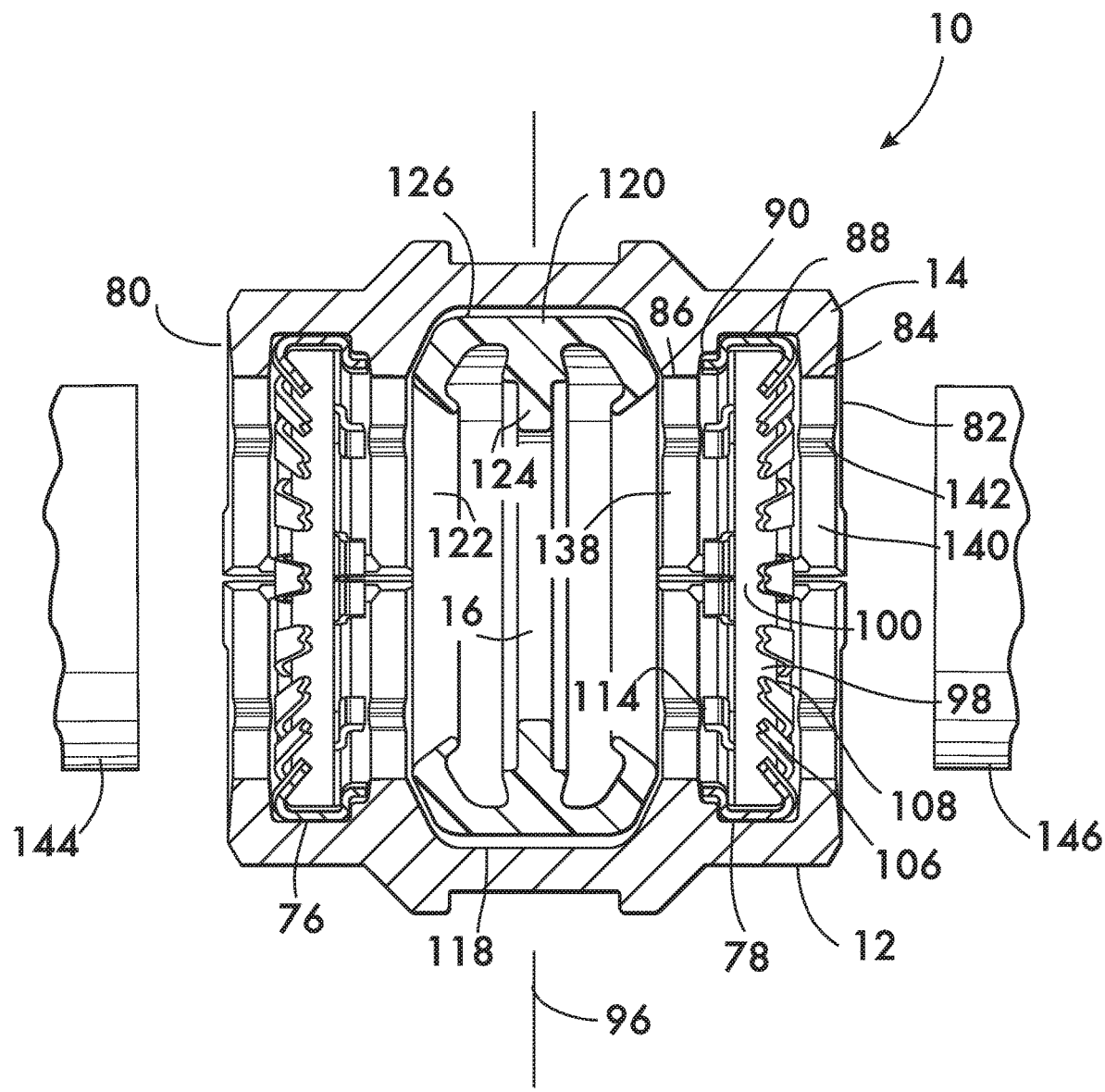
FIG. 3 is a sectional view of the example pipe coupling shown in FIG. 1.
Figure 4:
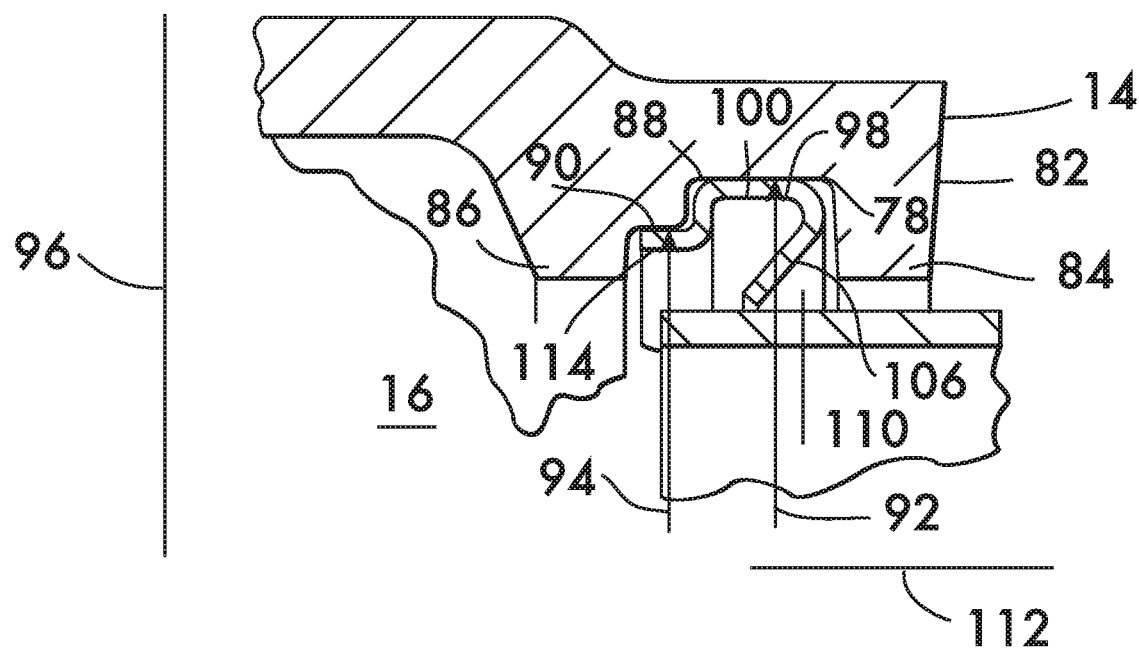
FIG. 4 is a partial sectional view of the example pipe coupling shown in FIG. 1.

As shown in cross section in FIG. 3, each segment 12 and 14 comprises first and second channels 76 and 78 respectively positioned on opposite sides 80 and 82 of each segment. The first and second channels 76 and 78 extend between the first and second ends 20 and 58 of the first segment 12, and the first and second ends 22 and 60 of the second segment 14 (see also FIG. 1). Channels 76 and 78 face the central space 16. As shown in detail in FIG. 4, each channel 76, 78 (channel 78 in segment 14 being shown) is defined by sidewalls 84 and 86 positioned in spaced relation to one another. Each channel 76, 78 furthermore has first and second floors 88 and 90 located between sidewalls 84 and 86. Floors 88 and 90 face the central space 16 and are arcuate in shape as they extend between the ends 20 and 58 and 22 and 60 of the segments 12 and 14. As shown in FIG. 4, first floor 88 is positioned closer to the side 82 of segment 14 and has a greater radius of curvature 92 than the second floor 90, which has a radius of curvature 94. As shown in FIG. 3, the channels 76 and 78 and the arrangement of their floors 88 and 90 are symmetric about an axis 96 extending transversely through the coupling 10.

As further shown in FIGS. 3 and 4, the channels 76 and 78 each receive a respective retainer 98. Retainer 98 is shown in detail in FIG. 5 and comprises an arcuate band 100 having oppositely disposed ends 102 and 104. Band 100 thus forms a "split ring" which, when compressed radially will deform to a smaller radius of curvature (see FIG. 7). In some embodiments, each band 100 is sized such that contact between bands 100 and the respective segments 12 and 14 within channels 76 and 78 allow one or both bands 100 to support segments 12 and 14 in spaced apart relation as shown in FIG. 1. A plurality of teeth 106 are positioned along one edge 108 of band 100. Teeth 106 project from band 100 toward the central space 16. As shown in FIGS. 3 and 4, teeth 106 are oriented angularly toward axis 96 with respect to a line 110 extending radially from an axis 112 arranged coaxially with the central space 16. The angular orientation is advantageous for retaining pipe elements as described below.

Figure 6:
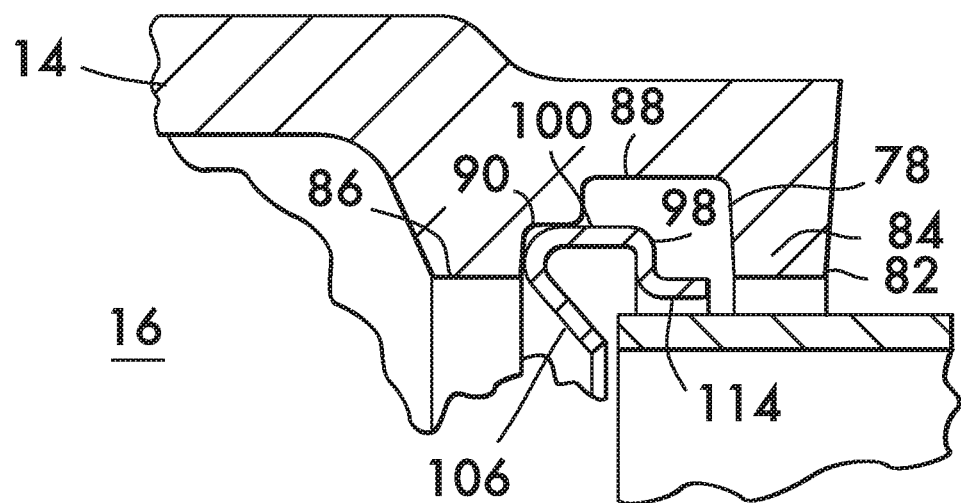
FIG. 6 is a partial sectional view of the example pipe coupling shown in FIG. 1.
Figure 5:
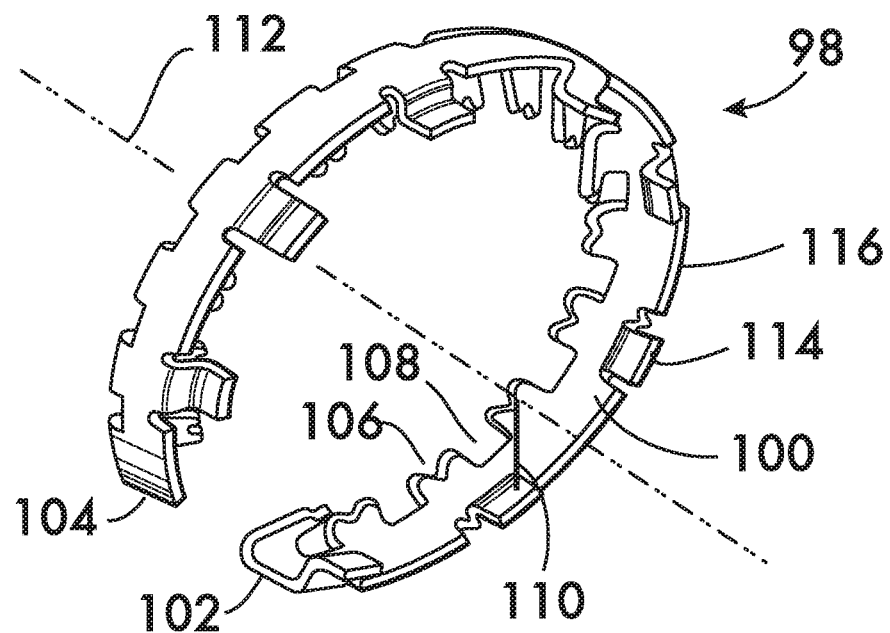
FIG. 5 is an isometric view of a component used in an example coupling.

As shown in FIG. 5, at least one, but in this example embodiment, a plurality of tabs 114 are positioned along an edge 116 oppositely disposed from edge 108. As shown in FIG. 4, the one or more tabs 114 are oriented substantially perpendicular to the line 110 and are offset from the band 100 toward axis 112 arranged coaxially with the central space 16. This offset of tabs 114 permits them to overlie the second floor 90, and the band 100 to overlie the first floor 88, when retainers 98 are properly received within respective channels 76 and 78 as shown in FIGS. 3 and 4. Proper assembly of the retainers 98 within the channels 76 and 78 permits pipe elements to be inserted into a pre-assembled coupling 10 as described below. However, as shown in FIG. 6, the channels 76 and 78 (78 shown) and the retainers 98 are sized such that if the coupling 10 is improperly assembled with the band 100 overlying the second floor 90 and the tab or tabs 114 overlying the first floor 88, the retainer's radius of curvature is smaller and teeth 106 effectively prevent insertion of the pipe element into the central space 16 with the segments 12 and 14 in spaced apart relation in the pre-assembled state. This cooperation between the retainer 98, its tabs 114, teeth 106, and the first and second floors 88 and 90 of channels 76 and 78 prevent improper assembly of a pipe joint using coupling 10. If the pipe elements could be inserted with the retainer teeth 106 facing in the wrong direction (FIG. 6) then the teeth will not be self-actuating against forces which would draw or push the pipe element out of the coupling. Thus the retainer would provide reduced mechanical restraint.

As shown in FIG. 3, segments 12 and 14 further comprise a third channel 118. Channel 118 is positioned between the first and second channels 76 and 78 and faces the central space 16. Channel 118 receives a ring seal 120 which ensures a fluid tight joint. Ring seal 120 is formed of a flexible, resilient material such as EPDM or other rubber compounds and has inner surfaces 122 sized to receive pipe elements when they are inserted into the central space 16 as described below. A pipe stop 124 is positioned between inner surfaces 122. The pipe stop projects into the central space 16 and limits insertion of pipe elements by engaging the pipe elements when they are inserted into coupling 10 to the desired depth. Ring seal 120 also has an outer surface 126 that may be sized to engage and support the segments 12 and 14 in spaced apart relation as shown in FIGS. 1 and 3. One or more of the bands 100 may also cooperate with the ring seal 120 to support the segments 12 and 14 in spaced apart relation. The separation of the segments 12 and 14, when supported by the ring seal 120 and/or band or bands 100, is sufficient to permit pipe elements to be inserted into the coupling when it is in its pre-assembled state (FIGS. 1, 2 and 3). FIG. 3 shows an example channel configuration wherein the second floors 90 are positioned between the first floors 88 and the third channel 118. In this example the tabs 114 project toward the third channel 118 when the retainers 98 are properly oriented within the coupling 10.

As shown in FIG. 1, coupling 10 further comprises a first aperture 128 in segment 12. In this example embodiment aperture 128 is aligned with the first channel 76 and provides a line of sight 130 toward the central space 16. In this example embodiment, aperture 128 is positioned at the interface 132 between segments 12 and 14 and is formed as a trough 134 in both segments 12 and 14. The troughs 134 in each of the segments 12 and 14 are aligned so that when the segments are drawn into engagement they provide a view toward the central space 16 to permit visual confirmation that the retainer is present and that a pipe element is present within the central space and seated at least past the retainer. As shown in FIG. 1A, a second aperture 136 is also positioned in at least one of the segments 12 and 14. The second aperture 136 is aligned with the second channel 78 in this embodiment (see FIG. 3) and also provides a line of sight toward central space 16. Again, in the example embodiment 10 illustrated, the second aperture 136 is positioned between the segments 12 and 14. Aperture 136 is also formed by troughs 134 at the interface 132 between the segments 12 and 14. The second aperture also permits visual confirmation that a pipe element is present within the central space 16.

As shown in FIGS. 1 and 3, each segment 12 and 14 also comprises first and second arcuate surfaces 138 and 140 respectively positioned on sidewalls 84 and 86. Arcuate surfaces 138 and 140 face the central space 16 and a plurality of projections 142 may be positioned on each arcuate surface 138, 140. Projections 142 are arranged in spaced relation to one another along the arcuate surfaces 138 and 140 and project toward the central space 16. As described below, projections 142 engage the pipe elements and increase joint stiffness and accommodate a wider tolerance range on the pipe outer diameter.

When projections 142 are forced into engagement with the pipe elements as the segments 12 and 14 are drawn toward one another they add stiffness to the joint between the coupling 10 and the pipe elements upon their engagement with the outer surfaces of the pipe elements. Additionally, the projections 142 allow the coupling 10 to accommodate a larger pipe outer diameter tolerance in combination with known manufacturing tolerances for coupling 10. When the outer diameter of pipe elements is near the small end of the tolerance range the presence of the projections 142 ensures mechanical engagement between the coupling 10 and the pipe elements. However, when the pipe diameter is at the large end of the tolerance range the projections will tend to deform the outer surface of the pipe elements locally, and projections 142 may also deform. For couplings 10 used with plain end pipe elements this is particularly advantageous as plain end couplings are typically designed so that the arcuate surfaces 138, 140 (see FIG. 3) do not engage the outer surfaces of the pipe elements. This arrangement ensures that the clamping force provided by the fastener 70 (see FIG. 2) is fully applied to the retainers 98. Were the arcuate surfaces 138, 140 of the coupling 10 to engage the pipe outer surface directly, the clamping force would be divided between contact of the arcuate surfaces with the pipe and contact between the retainers 98 and the pipe elements. Because the surface areas of projections 142 are small relative to the arcuate surfaces 138, 140, and contact the pipe element outer surface only at discrete points, only minimal clamping force from the fastener 70 needs to be diverted into contact between the projections 142 and the pipe elements to provide enhanced stiffness without compromising the axial retention provided by the retainers 98. Projections 142 are advantageous in that they achieve greater rigidity even with the lesser clamping force available with the single fastener design of the coupling 10. The single fastener 70 acts in conjunction with the spring assembly 18 to ensure that adequate clamping force is applied to the pipe elements.

Figure 8:
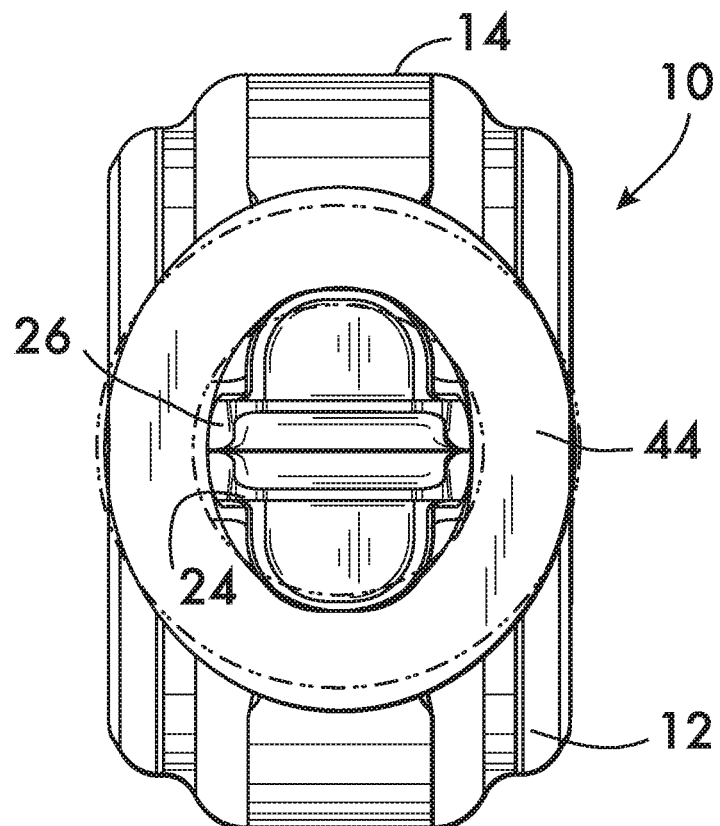
FIG. 8 is an end view of the example pipe coupling shown in FIG. 1.
Figure 7:
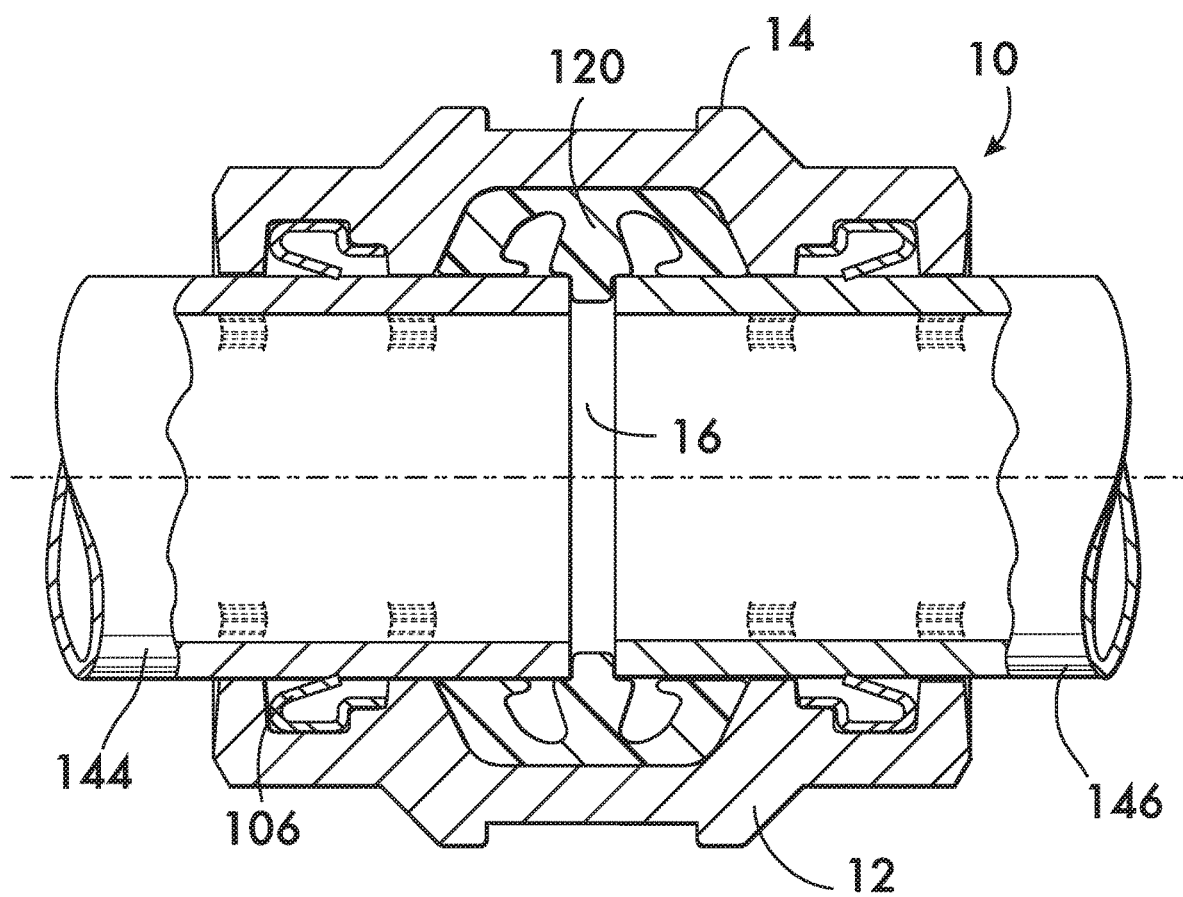
FIG. 7 is a sectional view of the example pipe coupling shown in FIG. 1.

Operation of coupling 10 is illustrated in FIGS. 1, 3, 7 and 8. With the coupling 10 in the pre-assembled state as shown in FIGS. 1 and 3, pipe elements 144 and 146 are inserted into the central space 16. The pipe elements clear the teeth 106 of retainers 98, engage and the inner surfaces 122 of ring seal 120, and engage the pipe stop 124. Next, the fastener 70 is tightened (see also FIG. 2) drawing the segments 12 and 14 toward one another. As shown in FIG. 7 the ring seal 120 and the teeth 106 are compressed between the segments 12 and 14 and the pipe elements 144 and 146. Pivoting motion of the segments about fulcrums 28 and 32 (see FIG. 2) is resisted by the biasing force of the spring assembly 18. As shown in FIG. 8, the elements comprising the spring assembly, in this example, the bosses 24 and 26 and the ring 44, deform in proportion to the spring force, with the ring 44 extending into an oval shape and the bosses 24 and 26 bending as cantilevers (deformed shapes shown in solid line, undeformed in broken line). Apertures 128, 136 may be used to visually confirm that the pipe elements are present in the coupling 10.

Figure 9:
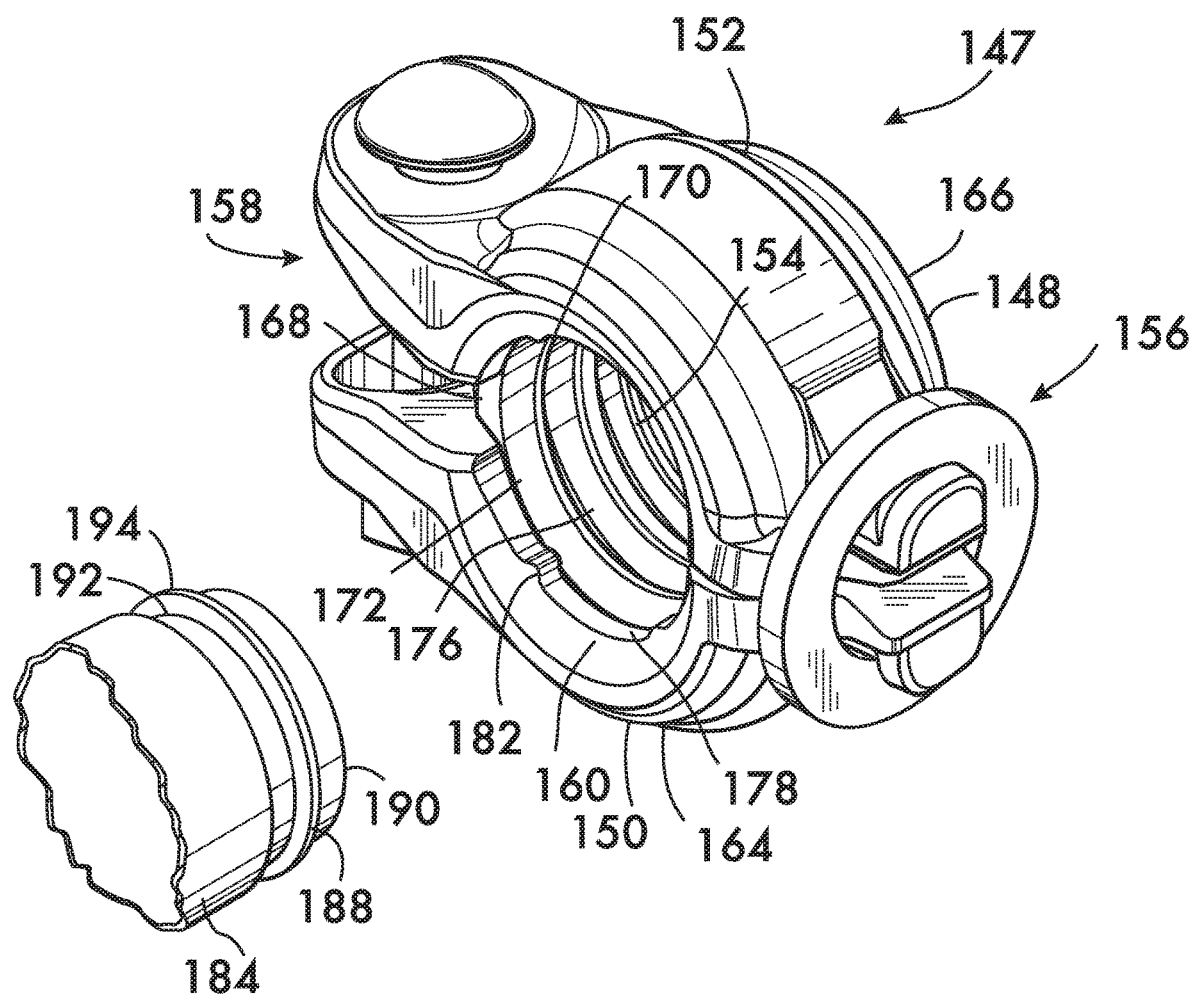
FIG. 9 is an exploded isometric view of an example preassembled combination coupling and pipe element according to the invention.
Figure 9A:
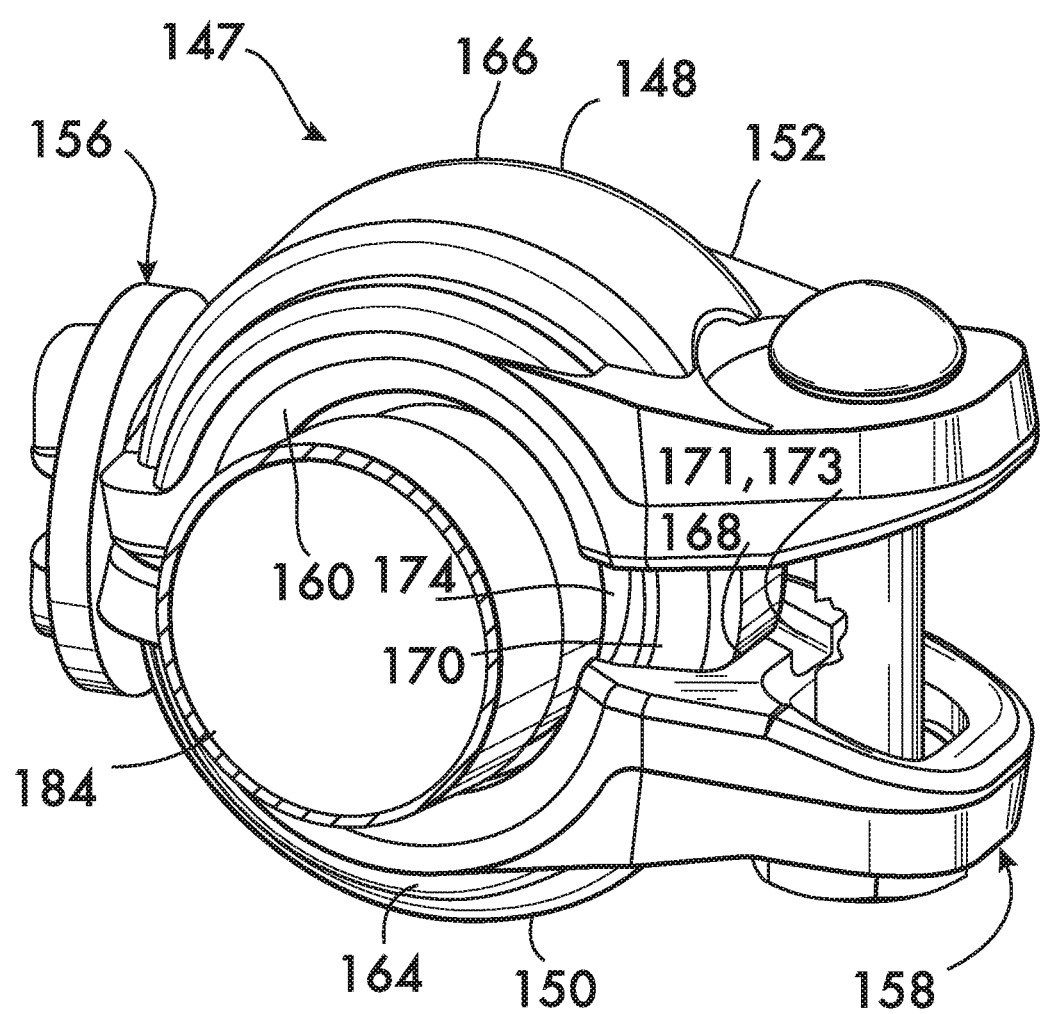
FIG. 9A is an isometric view of the example combination of FIG. 9 shown in a preassembled state.

FIG. 9 shows an exploded view, and FIG. 9A shows an assembled view, of a preassembled combination coupling and pipe element 147 according to the invention. The combination coupling and pipe element 147 comprises a coupling 148 and a first pipe element 184, and is used to couple a second pipe element 186 to the first pipe element (see FIGS. 10 and 11). The second pipe element 186 may, for example, be part of a piping network (not shown), and the first pipe element 184 may be part of another assembly, such as a flexible hose for a fire suppression sprinkler, or an inlet or and outlet of a pump or a valve to cite a few examples.

The coupling 148 comprises first and second segments 150 and 152 positioned end to end surrounding a central space 154 for receiving pipe elements. A spring assembly 156 and an adjustable attachment assembly 158, as described above for coupling 10, join the ends of the segments. Coupling 148 further comprises first and second shoulders 160 and 162 (see also FIG. 10) positioned on opposite sides 164, 166 of each segment 150 and 152. Shoulders 160 and 162 extend lengthwise along the segments 150 and 152 and project toward the central space 154. Shoulders 160 and 162 define a channel 168 which extends between the ends of the segments 150 and 152 and faces central space 154. Channel 168 receives a ring seal 170 for a fluid tight joint. Ring seal 170 has an inner surface 172 sized to receive pipe elements (see also FIG. 10) and an outer surface 174 which may be sized to support the segments 150 and 152 in the preassembled state, i.e., in spaced relation sufficient to insert the second pipe element 186 into the central space 154 without disassembling the combination 147. FIG. 9A shows the coupling in the preassembled state with the segments 150 and 152 in spaced relation. As described above for coupling 10, the spring assembly 156 may also be used to bias the segments 150 and 152 into the open, preassembled state shown in FIG. 9A. Ring seal 170 may also comprise a pipe stop 176 positioned between the inner surfaces 172. Pipe elements inserted into the central space engage the pipe stop 176 when properly seated (see FIG. 11).

Figure 10:
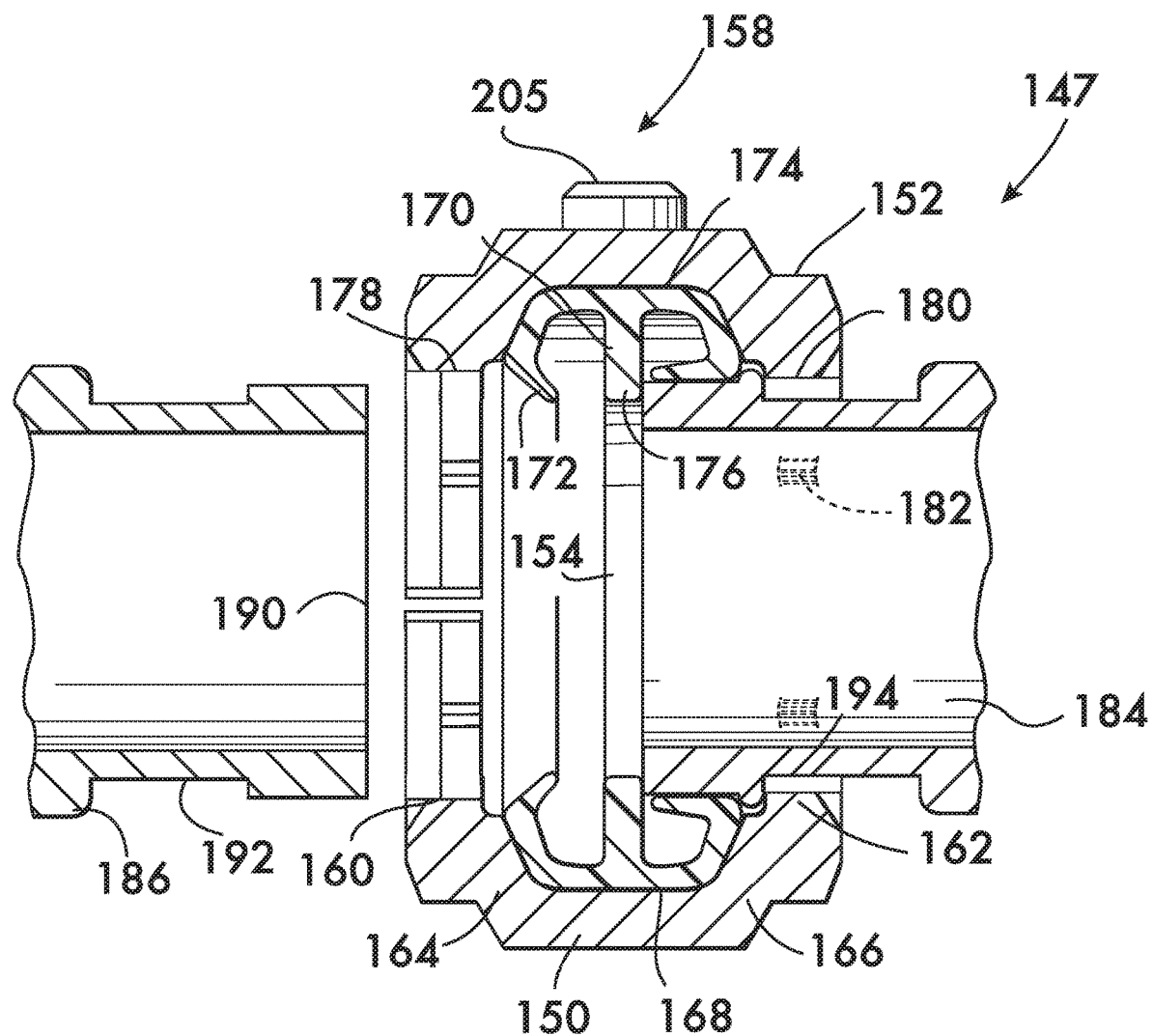
FIGS. 10 and 11 are sectional views of the example combination shown in FIG. 9 illustrating assembly of a pipe joint.

As shown in FIGS. 9 and 10, each segment 150 and 152 further comprises a first arcuate surface 178 positioned on the first shoulder 160 and a second arcuate surface 180 positioned on the second shoulder 162. Arcuate surfaces 178 and 180 face the central space 154. A plurality of projections 182 may be positioned on the arcuate surfaces 178 and 180. Projections 182 are arranged in spaced relation to one another along the arcuate surfaces 178 and 180 and project toward the central space 154. Projections 182 engage the pipe elements and increase joint stiffness and accommodate a wider tolerance range on the pipe outer diameter. As shown in FIG. 9A, the coupling 148 may have at least one aperture 171 in one of the segments 150, 152. In this example the aperture 171 comprises a trough 173 positioned at an interface between the first and second segments 150 and 152.

As shown in FIG. 9, the first pipe element 184 comprises a rim 188 which projects outwardly from the first pipe element and extends circumferentially around. Rim 188 is positioned in spaced relation to an end 190 of the first pipe element 184, and as shown in FIGS. 9A and 10, is captured within the central space 154 by engagement with the shoulder 162. Rim 188 may be defined by a circumferential groove 192 in the first pipe element 184, or a circumferential bead 194 which projects radially outwardly from the first pipe element 184. In the example embodiment shown in FIG. 9, the rim 188 is defined by both the groove 192 and the bead 194.

Figure 9B:
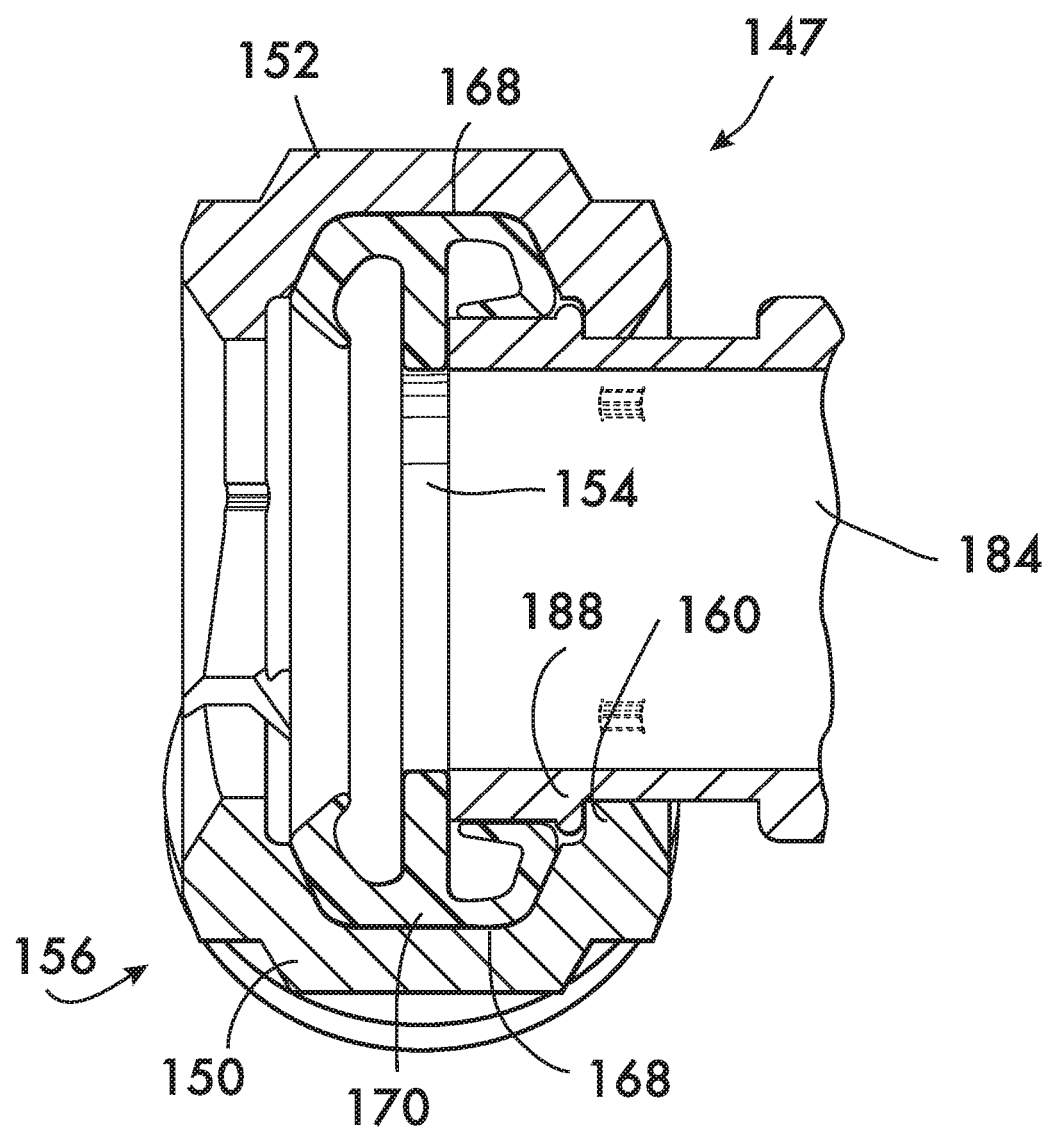
FIG. 9B is a sectional view of the example combination shown in FIG. 9.
Figure 9C:
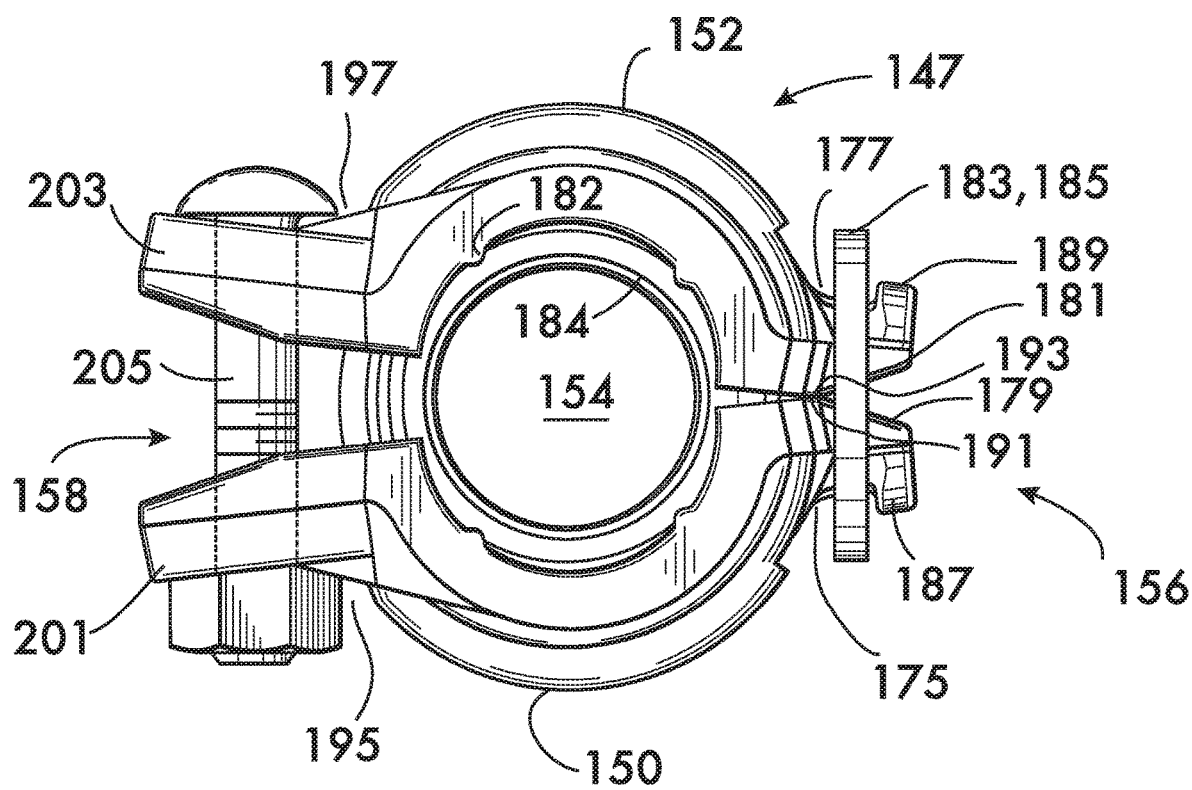
FIG. 9C is an axial view of the example combination shown in FIG. 9.

The preassembled combination coupling and pipe element 147 shown in FIG. 9A in its preassembled state is assembled as illustrated in FIGS. 9B and 9C. The first pipe element 184 is engaged with the ring seal 170. The ring seal 170 is then positioned within the channel 168 of the first segment 150 while the rim 188 is engaged with the first shoulder 160 within what will become the central space 154. Next the spring assembly 156 is formed by engaging the first end 175 of the first segment 150 with the first end 177 of the second segment 152. In the example shown, engagement of the first ends 175 and 177 is effected by joining a first boss 179 projecting from the first end 175 of the first segment 150 with a second boss 181 projecting from the first end 177 of the second segment 152 and pivotably linking them together using a link 183. In this example the link 183 comprises a ring 185 into which the bosses 179 and 181 are inserted, each boss having a respective head 187, 189 which retain the bosses within the ring 185 when the segments are pivoted into the preassembled state. As shown in FIG. 9C, the second boss 181 is contacted by a fulcrum 191 on the first boss 179, and the first boss 179 is contacted by a fulcrum 193 on the second boss 181. The bosses 179 and 181 joined by the ring 185 act as cantilever springs which bias the segments 150 and 152 away from one another and can also be used to support the segments in spaced apart relation, either alone or in combination with the ring seal 170 as described above. Next the second end 195 of the first segment 150 is attached to the second end 197 of the second segment 152 using the adjustable attachment assembly 158. In this example embodiment the adjustable attachment assembly comprises a first lug 201 mounted on the second end 195 of the first segment 150, a second lug 203 mounted on the second end 197 of the second segment 152, and a fastener 205 extending between the first and second lugs.

Working together with the spring assembly 156 (and/or the ring seal 170), initial tightening of the fastener 205 holds the segments 150 and 152 in the preassembled state shown in FIGS. 9A and 9C. In this configuration the segments 150, 152 are supported in spaced apart relation sufficient to permit the second pipe element 186 to be inserted into the central space 154 (see FIGS. 10-11) while also capturing the first pipe element 184 by engagement between the shoulder 160 and the rim 188. As shown in FIG. 9C, the projections 182 increase the ability of the segments 150, 152 to retain the first pipe element 184 when the combination 147 is in the preassembled state.

Figure 11:
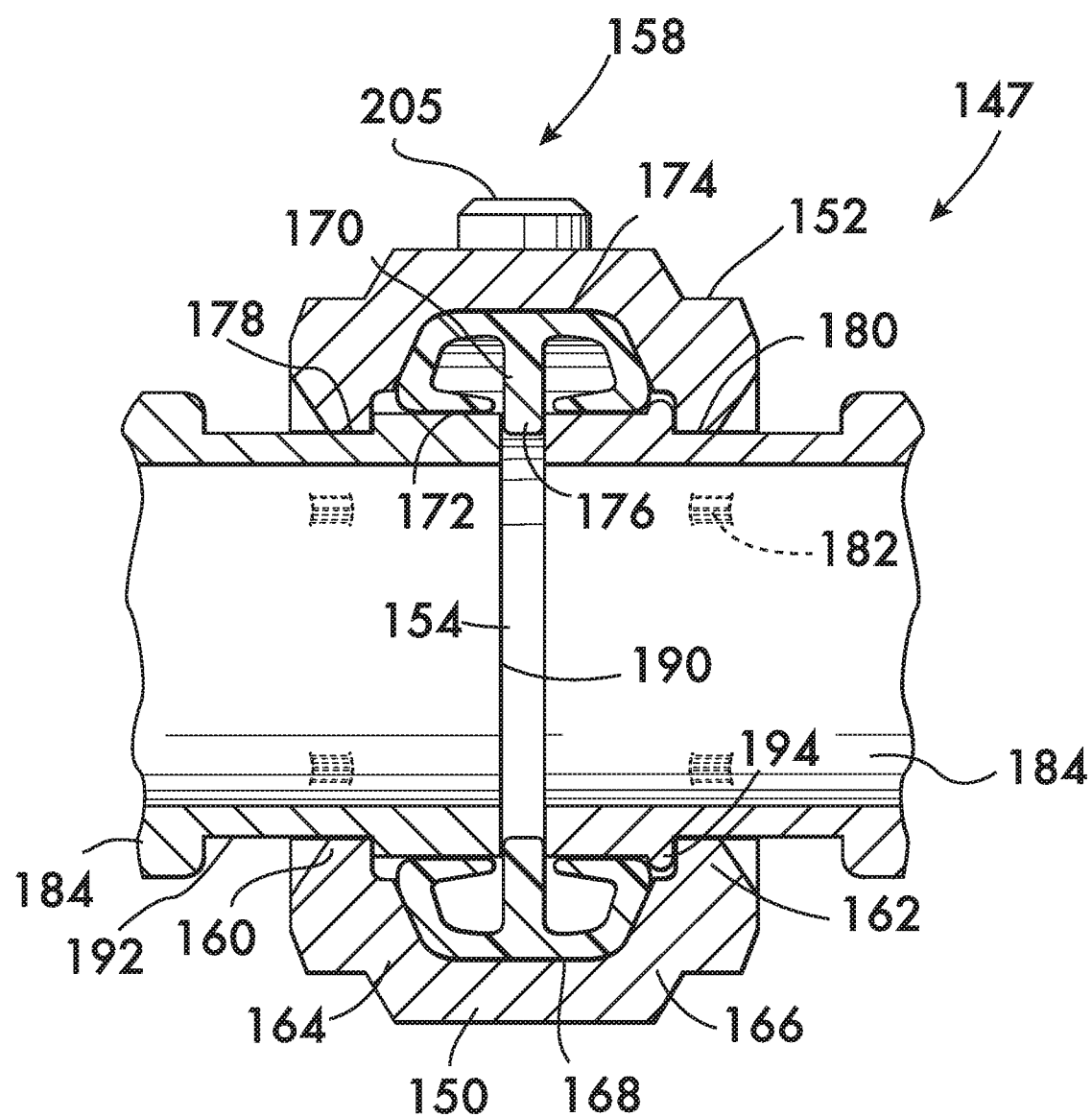

FIGS. 10 and 11 illustrate use of the combination 147 to join pipe elements 184 and 186. As shown in FIG. 10, with the combination 147 in the preassembled state the second pipe element 186 is inserted into the central space 154. Upon insertion the second pipe element 186 engages with surface 172 on the ring seal 170 (the first pipe element 184 is similarly engaged with the ring seal). As shown in FIG. 11, the segments are then drawn toward one another using the adjustable attachment assembly 158. In this example the fastener 205 is tightened, drawing the segments 150 and 152 against the biasing force of the spring assembly 156 (see FIG. 9C) and compressing the ring seal 170 to form a fluid tight joint. If projections 182 are present they engage the pipe elements 184, 186, otherwise, the arcuate surfaces 178 and 180 engage the pipe elements. FIG. 11 shows the arcuate surface 178 engaging a groove 192 in the second pipe element 186.

Figure 12:
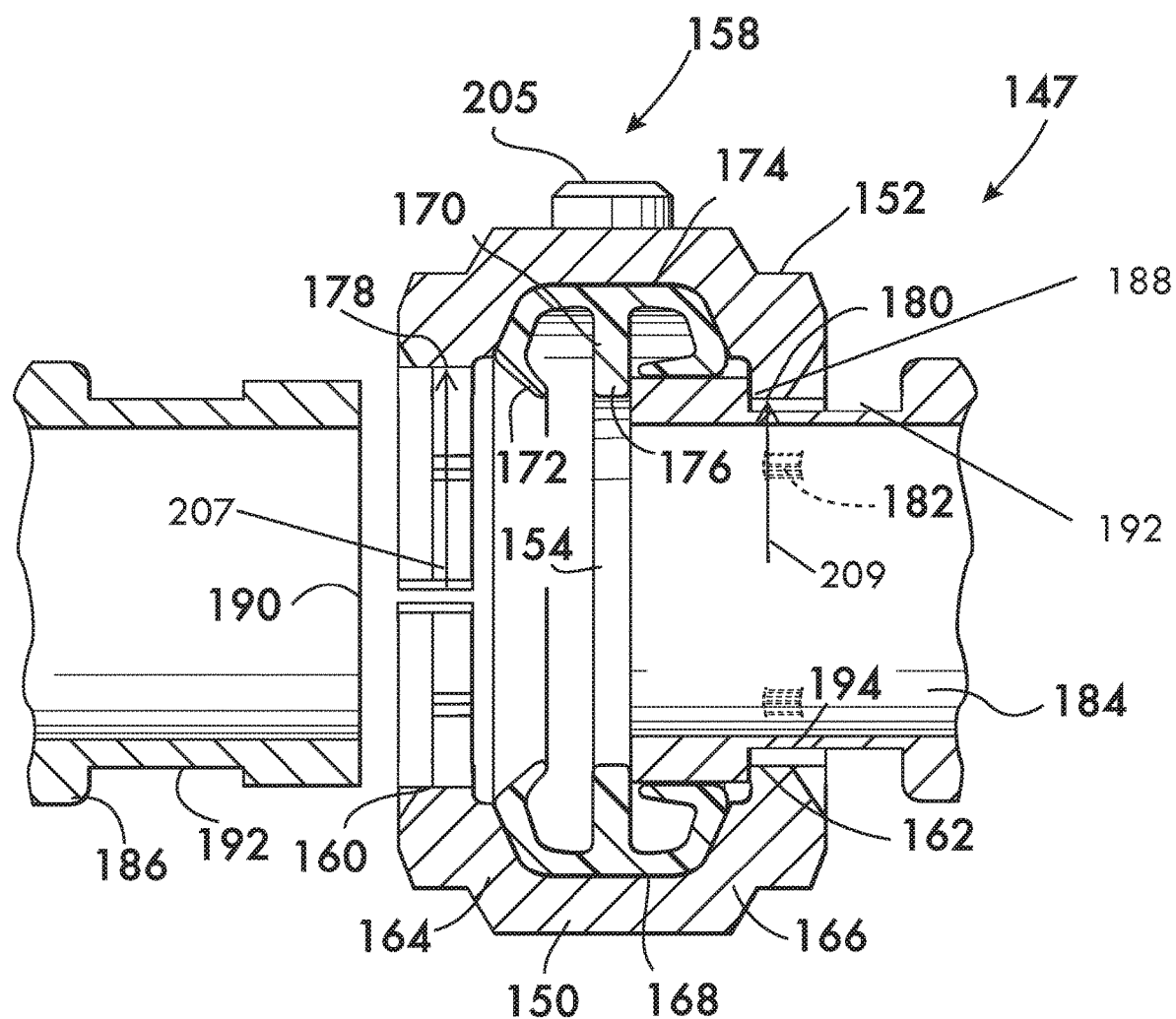
FIG. 12 is a sectional view of an example preassembled combination coupling and pipe element.

FIG. 12 shows an embodiment of the preassembled combination 147 wherein the first arcuate surface 178 has a first radius of curvature 207 and the second arcuate surface 180 has a second radius of curvature 209. In this example embodiment the second radius of curvature 209 is less than the first radius of curvature 207. This configuration of radii is appropriate when rim 188 of the first pipe element is defined by a groove 192 because it permits the first pipe element 184 to be captured by coupling 148 when it is in the preassembled state, while allowing the second pipe element 186 to be inserted into the central space 154 without disassembling the coupling. The groove 192 in the first pipe element 184 may be deeper than the groove 192 in the second pipe element 186 to accommodate this embodiment.

The use of the combination 147 having a single fastener 205 and a captured pipe element 184 provides significant advantage by increasing the stability of the coupling on the pipe elements through engagement between the coupling shoulder and the rim of the pipe element. The presence of the spring assembly and single fastener significantly inhibit the ability to manipulate the coupling by rocking it, making it much more difficult to separate the pipe element from the coupling. The single fastener also simplifies the tightening step, as only one fastener need be tightened, as opposed to two fasteners, which must be tightened in an alternating sequence to avoid damage to the ring seal.

Couplings according to the invention are expected to improve the efficiency of installation and the reliability of joints formed. Further expected advantages include a lighter weight coupling which has a lower external profile and which is smaller for a given pipe size. Having only one fastener reduces the part count and contributes to reduced errors during assembly, as well as eliminating the need to tighten more than one fastener in an alternating sequence.

What is claimed is:

1. A coupling for joining pipe elements, said coupling comprising:
   first and second segments positioned end to end surrounding a central space for receiving said pipe elements;
   a spring assembly joining a first end of said first segment to a first end of said second segment, said spring assembly biasing said segments away from one another, said spring assembly comprising:
   a first boss projecting from said first end of said first segment;
   a second boss projecting from said first end of said second segment and positioned adjacent to said first boss;
   a first fulcrum positioned on said first boss and contacting said second boss, said segments pivoting about said first fulcrum;
   a link extending between and capturing said first and second bosses;
   an adjustable attachment assembly joining a second end of said first segment to a second end of said second segment, said adjustable attachment assembly adapted to draw said first and second segments toward one another and into engagement with said pipe elements.

2. The coupling according to claim 1, further comprising a second fulcrum positioned on said second boss, said second fulcrum contacting said first fulcrum.

3. The coupling according to claim 2, further comprising:
   a first land positioned contiguous with said first fulcrum on said first boss;
   a second land positioned contiguous with said second fulcrum on said second boss, said first and second lands being oriented angularly with respect to a plane defining an interface between said first and second segments.

4. The coupling according to claim 1, further comprising:
   a first head projecting from said first boss;
   a second head projecting from said second boss, said link engaging said first and second heads for retaining said link to said bosses.

5. The coupling according to claim 4, wherein said link comprises a ring encircling said first and second bosses.

6. The coupling according to claim 1, wherein said adjustable attachment assembly comprises:
   a first lug attached to said second end of said first segment;
   a second lug attached to said second end of said second segment and positioned in facing relation with said first lug, each said lug defining a respective hole;
   a fastener extending between said first and second lugs, said fastener being received within said respective holes, said fastener being adjustable for drawing said segments toward one another against said biasing of said spring assembly.

7. The coupling according to claim 1, wherein each of said first and second segments comprises:
   first and second channels positioned on opposite sides of said segments, each of said channels extending between said ends of said segments and having a first floor and a second floor facing said central space, said first floor having a greater radius of curvature than said second floor;
   first and second retainers positioned respectively in said first and second channels, each of said retainers comprising a band having oppositely disposed ends, a plurality of teeth being positioned along one edge of said band and projecting toward said central space, at least one tab being positioned along an opposite edge of said band, said band overlying said first floor, said at least one tab overlying said second floor when said retainers are positioned within said channels.

8. The coupling according to claim 7, comprising a plurality of said tabs.

9. The coupling according to claim 7, further comprising:
   a third channel positioned between said first and second channels in each of said segments, said third channels extending between said ends of said segments and facing said central space.

10. The coupling according to claim 9, wherein said at least one tab projects toward said third channel.

11. The coupling according to claim 9, further comprising:
   a ring seal positioned within said third channels, said ring seal having an inner surface sized to receive said pipe elements and an outer surface sized to support said segments in spaced apart relation sufficient to permit insertion of said pipe elements into said central space while said segments are attached to one another.

12. The coupling according to claim 11, wherein said retainer bands are sized to cooperate with said ring seals to support said housing portions in said spaced apart relation.

13. The coupling according to claim 7, wherein said teeth are oriented angularly with respect to a line extending radially from an axis arranged coaxially with said central space.

14. The coupling according to claim 7, wherein said at least one tab is oriented perpendicularly to a line extending radially from an axis arranged coaxially with said central space.

15. The coupling according to claim 7, wherein said at least one tab is offset from said band toward an axis arranged coaxially with said central space.

16. The coupling according to claim 7, further comprising a first aperture in at least one of said segments.

17. The coupling according to claim 16, wherein said first aperture is aligned with said first channel and provides a line of sight toward said central space.

18. The coupling according to claim 16, wherein said first aperture is positioned between said first and second segments.

19. The coupling according to claim 18, wherein said first aperture comprises a trough positioned at an interface between said first and second segments.

20. The coupling according to claim 16, further comprising a second aperture in at least one of said segments.

21. The coupling according to claim 20, wherein said second aperture is aligned with said second channel and provides a line of sight toward said central space.

22. The coupling according to claim 20, wherein said second aperture is positioned between said first and second segments.

23. The coupling according to claim 22, wherein said second aperture comprises a trough positioned at an interface between said two segments.

* * * * *